Nov. 13, 1951  H. H. PELZER  2,574,839
SPECTACLE LENS MOUNT
Filed Aug. 31, 1948
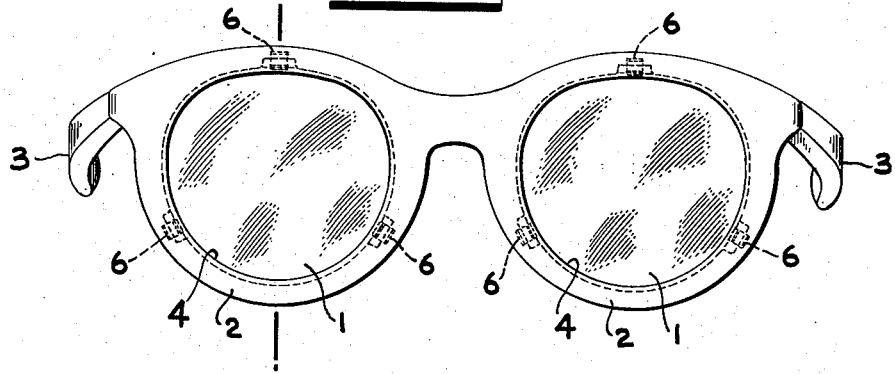
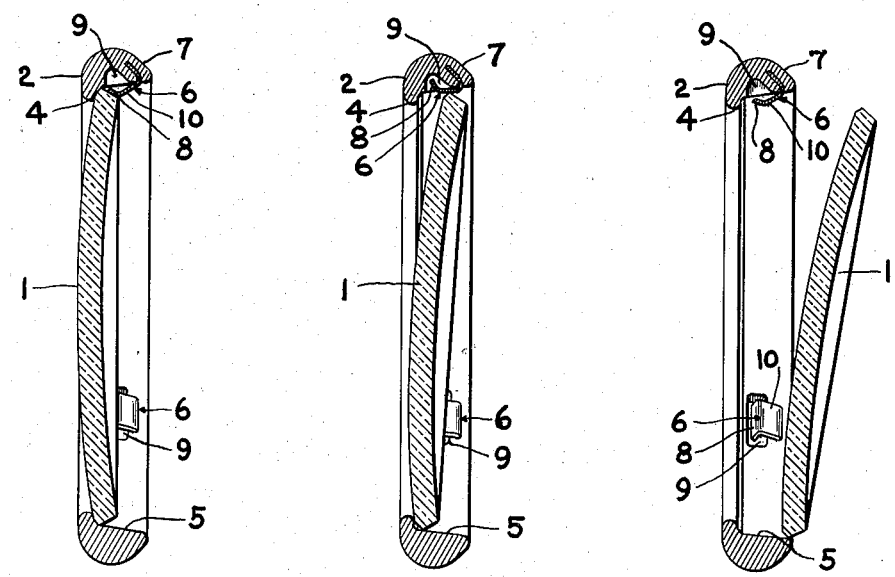
INVENTOR.
HAROLD H. PELZER
BY Patented Nov. 13, 1951

2,574,839

UNITED STATES PATENT OFFICE 2,574,839

SPECTACLE LENS MOUNT

Harold H. Pelzer, New York, N. Y.

Application August 31, 1948, Serial No. 46,989

1 Claim. (Cl. 88—47)

This invention relates to the new vogue in spectacles having frames made of metal or plastic material in a variety of ornamental shapes, of single or variegated colors, or embellished with an inlay of metal or jewels, and designed for wear on different occasions, and especially for wear by women to harmonize with wearing apparel. This practice requires a number of pairs of spectacles all having similar lenses to suit each user, thus involving considerable expense.

The object of this invention is to avoid such extra lens cost, and in carrying the invention into effect I provide the ornamental spectacle frames with means for removably holding the lenses in position so that when a user desires to change from one spectacle frame to another to harmonize with a particular costume, or for a particular occasion, the lenses may readily be removed by the user from one frame and inserted in another without the use of tools or danger of breakage.

The invention is illustrated in the accompanying drawings, in which,

Figure 1 is a plan view showing a conventional type of spectacle frame made of a plastic or moldable material, and Figures 2, 3 and 4 are vertical central cross-sectional views on the line indicated in Figure 1 illustrating, respectively, a lens seated and locked in position in the lens-ring; a lens partly unlocked and indicating the insertion or removal into or out of the lens-ring; and a lens about to be inserted or after removal from the frame.

Referring to the drawings, 1 indicates in the several views a lens of any type or shape adapted to fit into the frame rings 2 of corresponding shape and size, and projecting from the rings are the usual lugs to which the usual temple bows 3 are hinged. The frame rings are formed with flanges 4 against which the lenses are seated, and the inner perimeters of the lens rings are bevelled outward slightly from the flanges as indicated at 5 to permit free insertion or removal of the lenses to and from the seating position. Each lens ring is provided with a plurality of resilient retaining members in the form of light spring blades 6, preferably three, equally spaced, and preferably two being located below the horizontal diameter of the ring and the third blade being located at the upper vertical center as shown in Figure 1. In the molded form of the spectacle frame shown one end of each blade is preferably embedded in the ring sections 7 in the process of molding the frame as seen in the sectional views 2—4. The free ends of blades 6 are bent to a suitable angle at 8, Figure 4, so that the free flat ends will lie flat across the bevelled edge of the lens as seen in Figure 2. The frame rings 2 are recessed adjacent each spring blade 6 into which recesses 9 the free ends of the blades enter as the lens is pressed into seating position as seen in Figure 3.

The desired angular bend is given to the spring blades before application to the frame, the preferred shape being shown in Figure 4, and presents the flat pressure surface 8 and the cam surface 10 adapted to be engaged by the rim of the lens while being pressed into position, thereby bending the free end of the blade into its recess 9 as seen in Figure 3, and when the lens is seated against ring flange 4 the blades bend back to press the flat pressure faces 8 against the bevelled edge of the lens as seen in Figure 2 and thereby firmly holding the lens in its seated position against the ring flange 4.

When inserting a lens the rim is pressed against the two lower blades as seen in the lower parts of Figures 2 and 3, and then the upper part of the lens rim is pressed into locking position as indicated at the upper part of Figure 3. To remove a lens the upper part of the lens rim is unseated first to the position of Figure 3 which movement starts retraction of the lower blades to permit removal of the lens as seen in Figure 4.

The inside diameters of the lens-rings at the flanges 4 and the location of the blades 6 behind the flanges are such that the blades are not visible from the front side of the frame, and this feature together with the absence of retaining notches on the lens rim and the angle of the bevelled edge avoids interference with the vision of a user.

From the foregoing description it will be apparent that a single pair of lenses made in accordance with a formula for a user may be employed with a variety of frames having identical inner perimeters for the lenses, and that the change from one frame to another may be made by the user and without the use of tools or danger of breakage.

What I claim is:

In spectacles of the class described, the combination of a frame of moldable material having lens openings provided with integral seating flanges on the forward rim and outwardly bevelled inner perimeters extending from the inner sides of said flanges to the rear edges of the frame rims, rimless lenses having rearward bevelled edges the forward perimeters of which are adapted to seat against the frame flanges, three U-shaped resilient retaining members in each lens opening, each of said members having one end imbedded in the rear rim of the lens openings and the free ends projecting inward toward the lens seating flanges and presenting flat surfaces adapted to frictionally engage the width of the bevelled lens edges, said retaining members being located outside the field of vision and so spaced around the lens opening that the edges of the lenses engage two of said retaining members while pressure is applied to the lens adjacent the third member to simultaneously flex said members into position to cause the free flat faces thereof to engage the width of the lens bevels, and recesses in the bevelled frame rims adjacent the free ends of the retaining members into which the free ends enter as the lenses are pressed into position.

HAROLD H. PELZER.

REFERENCES CITED

The following references are of record in the file of this patent:

UNITED STATES PATENTS

| Number | Name | Date |
|---|---|---|
| 494,855 | Goodyear | Apr. 4, 1893 |
| 859,215 | Guilbert | July 9, 1907 |
| 1,137,444 | Adams | Apr. 27, 1915 |
| 1,520,977 | Stevens | Dec. 30, 1924 |
| 1,565,890 | Baker | Dec. 15, 1927 |
| 1,722,591 | Poeton | July 30, 1929 |

FOREIGN PATENTS

| Number | Country | Date |
|---|---|---|
| 463,000 | Great Britain | Mar. 19, 1937 |